US010697614B2

(12) United States Patent
Marshall

(10) Patent No.: US 10,697,614 B2
(45) Date of Patent: Jun. 30, 2020

(54) LAMP

(71) Applicant: John Reuben Marshall, Chertsey (GB)

(72) Inventor: John Reuben Marshall, Chertsey (GB)

( * ) Notice: Subject to any disclaimer, the term of this patent is extended or adjusted under 35 U.S.C. 154(b) by 0 days.

(21) Appl. No.: 16/342,301

(22) PCT Filed: Oct. 9, 2017

(86) PCT No.: PCT/EP2017/075611
§ 371 (c)(1),
(2) Date: Apr. 16, 2019

(87) PCT Pub. No.: WO2018/073032
PCT Pub. Date: Apr. 26, 2018

(65) Prior Publication Data
US 2020/0056760 A1   Feb. 20, 2020

(30) Foreign Application Priority Data

Oct. 18, 2016   (GB) .................................. 1617601.8

(51) Int. Cl.
*F21V 21/00* (2006.01)
*F21V 7/00* (2006.01)
(Continued)

(52) U.S. Cl.
CPC .............. *F21V 7/005* (2013.01); *F21S 6/004* (2013.01); *F21S 8/06* (2013.01); *F21V 14/04* (2013.01);
(Continued)

(58) Field of Classification Search
None
See application file for complete search history.

(56) References Cited

U.S. PATENT DOCUMENTS

| 4,744,016 A | 5/1988 | Lindberg |
| 2008/0273321 A1 | 11/2008 | Mundle et al. |
| 2020/0003381 A1* | 1/2020 | Liao .................... F21S 41/143 |

FOREIGN PATENT DOCUMENTS

| DE | 7727830 U1 | 2/1979 |
| DE | 102005035720 A1 | 2/2007 |

OTHER PUBLICATIONS

International Search Report and Written Opinion dated Nov. 21, 2017, in related PCT Application No. PCT/EP2017/075611.
(Continued)

*Primary Examiner* — Vip Patel
(74) *Attorney, Agent, or Firm* — Maschoff Brennan

(57) ABSTRACT

A lamp comprises: an elongate support, a plurality of light directing members, and a light generating unit. The light directing members are supported by the elongate support at respective different positions along the length of the elongate support. Each light directing member is rotatable at least partially around the elongate support to select a rotational position of the light directing member from a respective range of rotational positions of the light directing member; Each light directing member cooperates with the light generating unit so that at any rotational position within said respective range of rotational positions of the light directing member, the light directing member receives light from the light generating unit and directs the light away from the lamp in a direction dependent on the selected rotational position of the light directing member.

20 Claims, 6 Drawing Sheets

(51) Int. Cl.
  *F21V 29/67* (2015.01)
  *F21S 6/00* (2006.01)
  *F21S 8/06* (2006.01)
  *F21V 14/04* (2006.01)
  *F21V 17/02* (2006.01)
  *F21Y 103/10* (2016.01)
  *F21Y 115/10* (2016.01)

(52) U.S. Cl.
  CPC .............. *F21V 17/02* (2013.01); *F21V 29/67* (2015.01); *F21Y 2103/10* (2016.08); *F21Y 2115/10* (2016.08)

(56) References Cited

OTHER PUBLICATIONS

UK Search and Examination Report dated Mar. 13, 2017 in related application No. GB 1617601.8.

\* cited by examiner

LAMP

FIELD OF THE DISCLOSURE

The invention relates to a lamp.

BACKGROUND

A traditional table lamp generally emits light at roughly equal intensity in all horizontal directions, and also emits light both upwardly and downwardly. A spot lamp will generally emit light in a conical beam centred on a single direction.

SUMMARY

According to a first aspect of the invention, there is provided a lamp comprising: an elongate support, a plurality of light directing members, and a light generating unit; the light directing members being supported by the elongate support at respective different positions along the length of the elongate support, each light directing member being rotatable at least partially around the elongate support to select a rotational position of the light directing member from a respective range of rotational positions of the light directing member; each light directing member cooperating with the light generating unit so that at any rotational position within said respective range of rotational positions of the light directing member, the light directing member receives light from the light generating unit and directs the light away from the lamp in a direction dependent on the selected rotational position of the light directing member.

By selecting respective rotational positions for the light directing members, the user can control the directions in which light is directed away from the lamp. In this way, the lamp can be used to produce an aesthetically pleasing lighting arrangement within a room. Alternatively, the lamp may be used to illuminate different features of a room positioned in different directions away from the lamp.

Preferably, the rotational position of each light directing member can be selected independently of the rotational positions of the other light directing members. This provides a high degree of control over the directions in which light is directed.

Preferably, the light generating unit comprises a plurality of light sources, the light sources being supported by the elongate support at respective different positions along the length of the elongate support, each light directing member cooperating with a respective one of the light sources so that at any rotational position within said respective range of rotational positions of the light directing member the light directing member receives light from the cooperating light source and directs the light away from the lamp in a direction dependent on the selected rotational position of the light directing member.

By pairing each light directing member with a respective light source, it is possible to provide a lamp which is highly efficient in the sense that a large proportion of the light generated is directed in desired directions.

Preferably, each light directing member comprises a respective tube which defines a respective interior passage, the light from the light generating unit being directed along the interior passage of the light directing member away from the lamp. The tube may be open at both ends or at one end only. If the tube is open at both ends, light may be directed by the tube away from the lamp in two opposite directions. If the tube is open at one end only, light may be directed by the tube away from the lamp in a single direction. In a particularly preferred arrangement, each light directing member has a respective aperture which receives the elongate support so as to allow the rotation of the light directing member around the elongate support. In this case, the aperture of each light directing member transects the interior passage of the tube of the light directing member.

In the case where the light generating unit comprises a plurality of light sources, as described above, then preferably the elongate support comprises a tube. The light sources are positioned within the tube at respective different positions along the length of the tube. The tube has a light transmitting wall such that light from each light source which is received by the cooperating light directing member passes through the light transmitting wall to be received by the light transmitting member.

In a particularly preferred embodiment of the invention, the light generating unit comprises a plurality of light sources. The elongate support comprises a tube having a light transmitting wall and the light sources are positioned within the tube of the elongate support at respective different positions along the length of the tube. Each light directing member comprises a respective tube which defines a respective interior passage. Each light directing member also has a respective aperture which receives the tube of the elongate support so as to allow the rotation of the light directing member around the elongate support. The aperture of each light directing member transects the interior passage of the light directing member. The light directing members are arranged on the tube of the elongate support so that each light source lies within the aperture of a cooperating one of the light directing members. In this way, the light emitted from any particular light source passes through the light transmitting wall of the tube of the elongate support and then along the interior passage of the cooperating one of the light directing members to be directed away from the lamp.

In embodiments in which light sources are positioned within a tube of the elongate support, it may be desirable to provide a fan which propels air through the tube so as to cool the light sources.

Where the light generating unit comprises a plurality of light sources, each light source may be an LED light source. Alternatively, each light source may be an incandescent light bulb.

In addition, the lamp may comprise a base for positioning on a flat surface such that when the base is positioned on a flat surface, the base supports the elongate support in a generally upstanding orientation.

Alternatively, the lamp may comprise an attachment by which the elongate support may be suspended.

In accordance with a second aspect of the invention, there is provided a kit for assembly to form a lamp, the kit comprising: an elongate support, a plurality of light directing members, and a light generating unit: the light directing members being supportable by the elongate support at respective different positions along the length of the elongate support so that, when so supported, each light directing member is rotatable at least partially around the elongate support to select a rotational position of the light directing member from a respective range of rotational positions of the light directing members; and wherein, when assembled, each light directing member cooperates with the light generating unit so that at any rotational position within said respective range of rotational positions of the light directing member, the light directing member receives light from the light generating unit and directs the light away from the lamp in a direction dependent on the selected rotational position of the light directing member.

All of the preferred embodiments of the first aspect of the invention described above are equally applicable to the second aspect of the invention.

BRIEF DESCRIPTION OF THE DRAWINGS

The following is a more detailed description of embodiments of the inventions, by way of example, reference being made to the appended schematic drawings in which.

DETAILED DESCRIPTION

Figure 1:
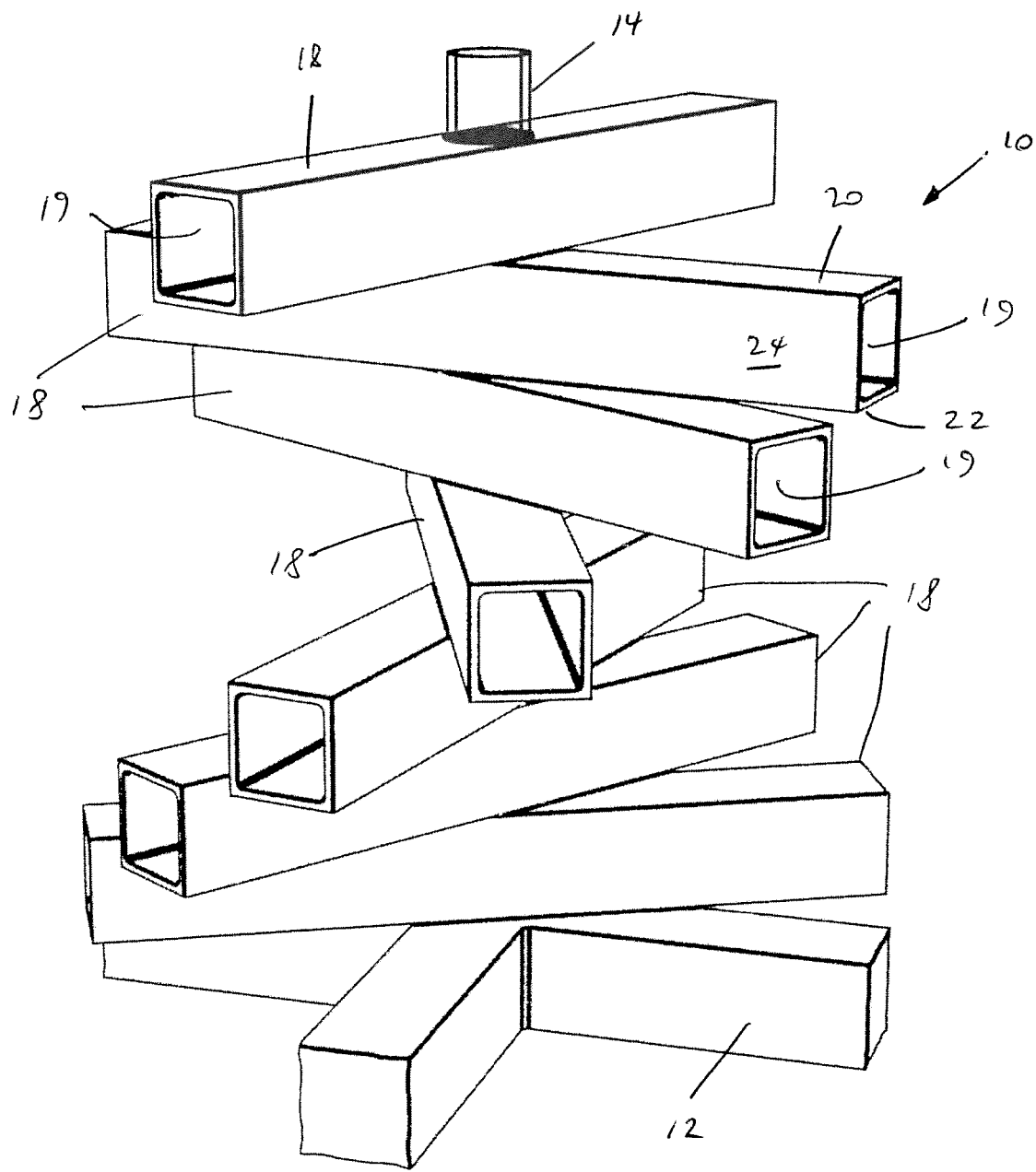
FIG. 1 is a perspective view of a first embodiment of a lamp.
Figure 2:
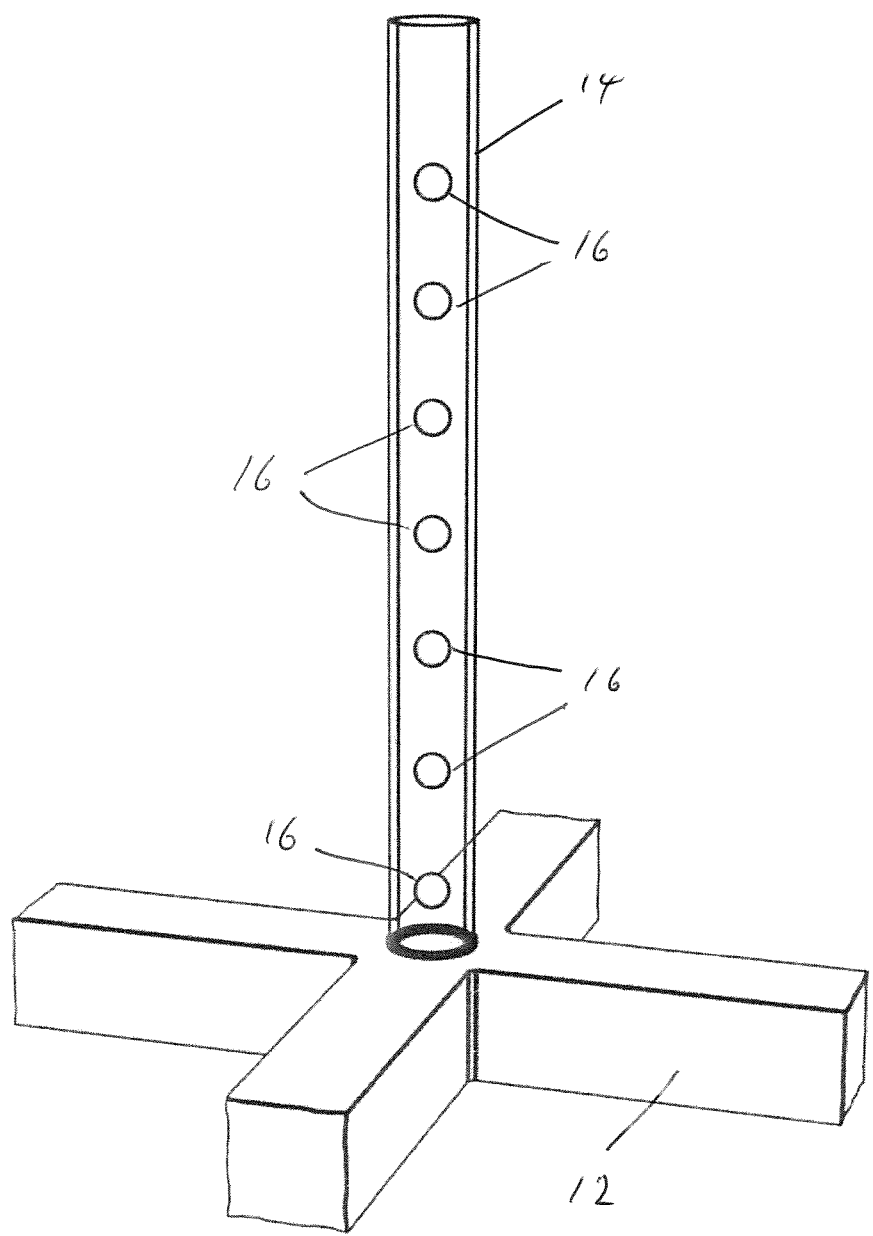
FIG. 2 is a perspective view showing a base, an elongate support tube, and seven light sources of the lamp of FIG. 1.
Figure 3:
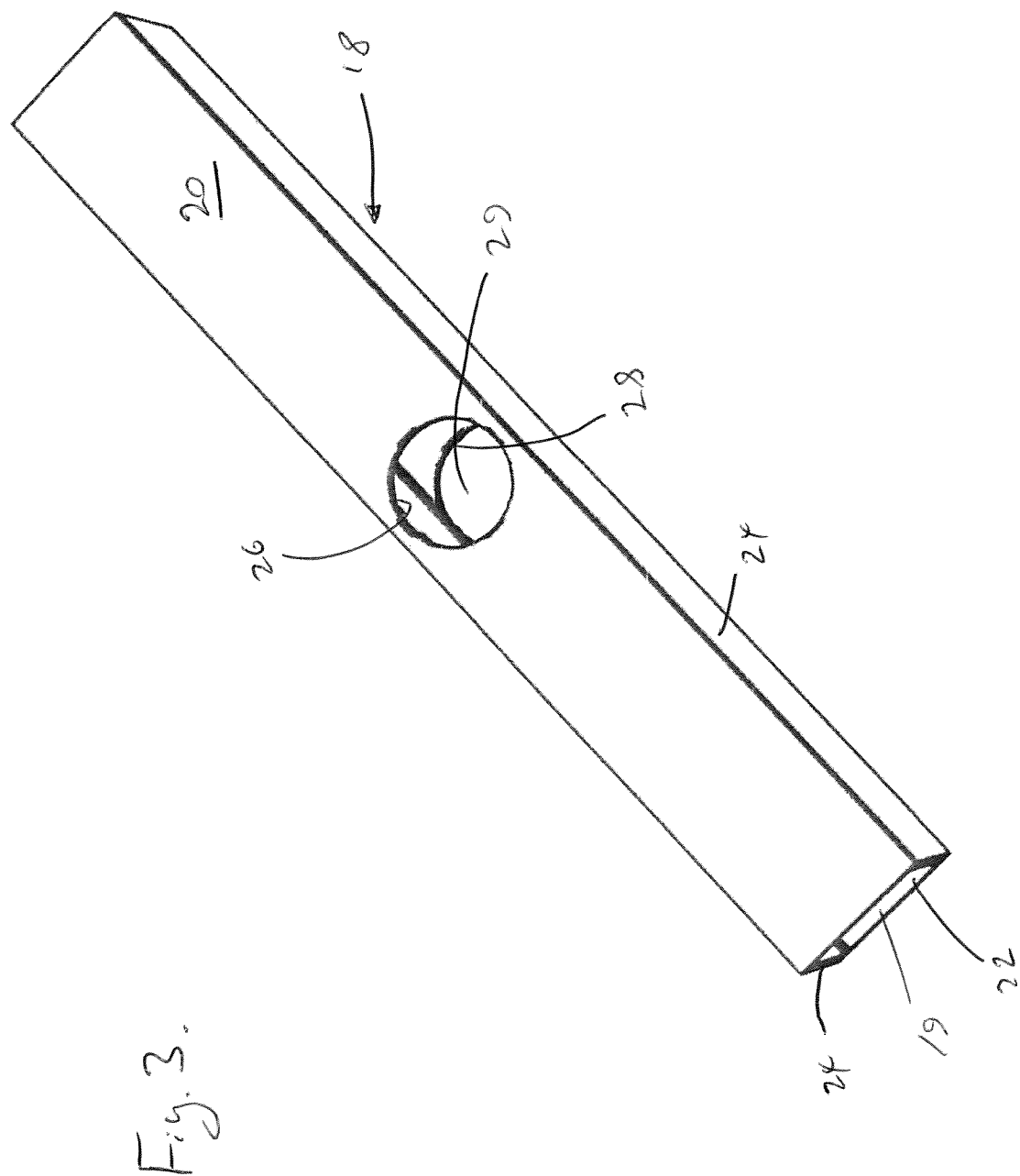
FIG. 3 is a perspective view of one of seven light directing members of the lamp of FIG. 1.

Referring first to FIGS. 1 to 3, the first lamp 10 comprises a base 12, an elongate support tube 14, a light generating unit including seven distinct light sources 16, and seven light directing members 18.

The elongate support tube 14 has a circular cross section and has a transparent wall. The elongate support tube 14 is fixed to the base 12 and the base 12 serves to hold the elongate support tube 14 in a vertical orientation. The base 12 may be positioned on any flat surface.

As best seen in FIG. 2, the seven light sources 16 of the light generating unit are positioned within the elongate support tube 14. The light sources 16 are equally spaced from one another along the length of the elongate support tube 14 for a purpose to be described below. The light generating unit also includes suitable wiring (not shown) so as to provide power to the light sources 16 for illumination of the light sources 16. The light sources 16 are shown in the figures in a schematic manner. The light sources 16 may be, for example, LED light sources. Alternatively, the light sources 16 may be incandescent light bulbs.

One of the light directing members 18 is shown in FIG. 3. In this particular embodiment, the light directing members 18 are identical to one another and so only the light directing member shown in FIG. 3 will be described.

The light directing member 18 shown in FIG. 3 is generally a tube having a square cross-section and defining an interior passage 19. In this embodiment, the tube has two open ends. Hence, the light directing member 18 has an upper wall 20, a lower wall 22, and two side walls 24 which connect the upper wall 20 to the lower wall 22. The upper wall 20 is provided with a top hole 26 which passes across the upper wall 20 and the lower wall 22 is provided with a bottom hole 28 which passes across the lower wall 22. The top and bottom holes 26, 28 are circular, have the same diameter and share a common axis. Hence the light directing member 18 may be considered to have a cylindrical aperture 29 starting at the top hole 26 and passing through the interior passage 19 to terminate at the bottom hole 28. The aperture 29 transects the interior passage 19 of the light directing member 18. The diameter of the top and bottom holes 26, 28 is slightly greater than the outer diameter of the elongate support tube 14.

The light directing member may be an aluminium extrusion which has been machined to form the top and bottom holes 26, 28.

Figure 4:
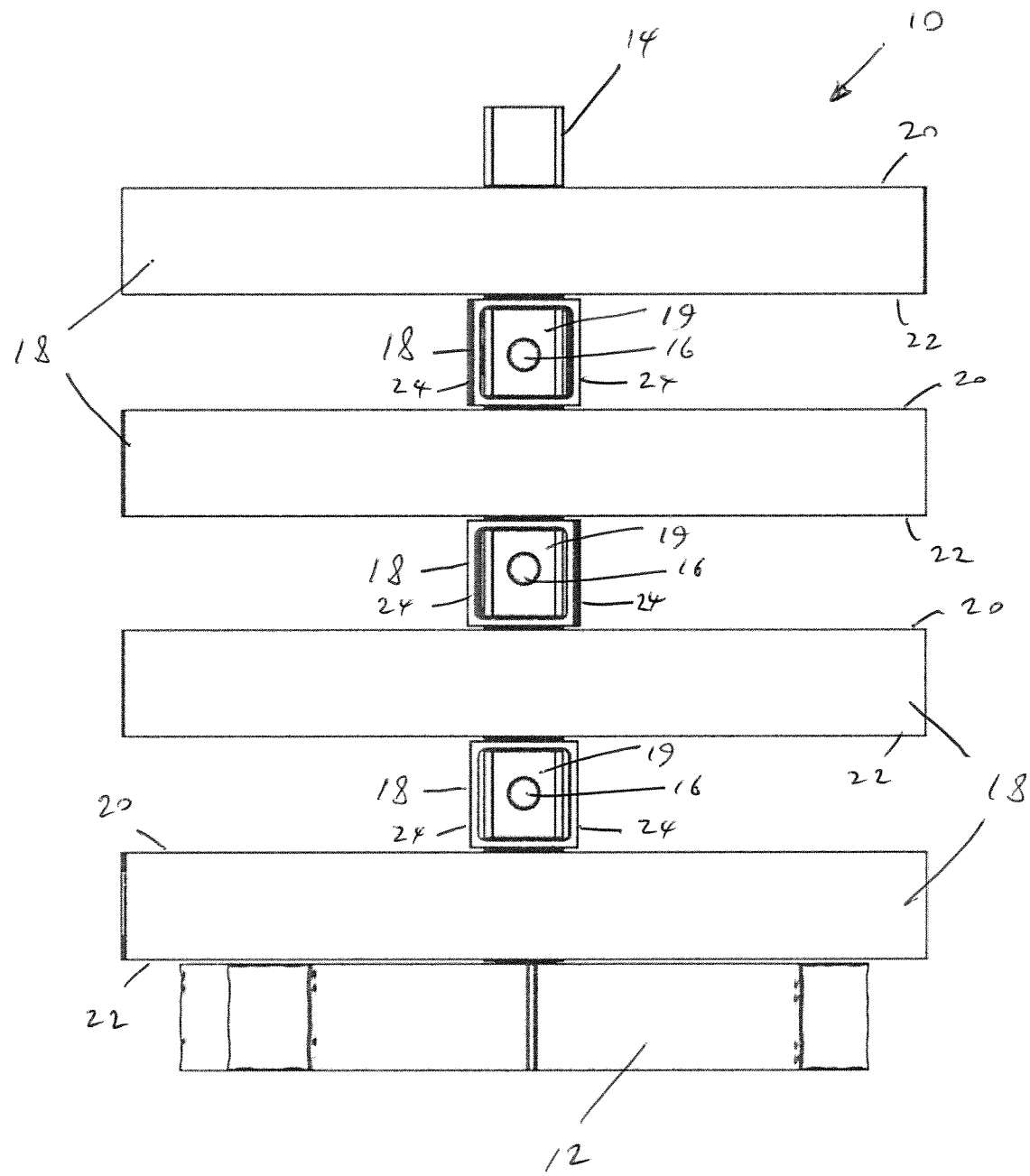
FIG. 4 is an orthographic view of the lamp of FIG. 1.

Referring now to FIGS. 1 and 4, the seven light directing members 18 are mounted on the elongate support tube 14 such that the elongate support tube 14 passes through the aperture 29 (including the top and bottom holes 26, 28) of each light directing member 18. Hence, as seen in FIGS. 1 and 4, the light directing members 18 are positioned one on top of another. Each light directing member 18, other than the light directing member 18 positioned at the bottom, has a lower wall 22 which rests against an upper wall 20 of the light directing member 18 positioned immediately below. The lower wall 22 of the light directing member 18 at the bottom rests against the base 12.

As the diameter of the top and bottom holes 26, 28 is slightly greater than the outer diameter of the elongate support tube 14, the light directing members 18 can be rotated freely around the elongate support tube 14. Hence, by comparing FIGS. 1 and 4, it will be noticed that the light directing members 18 have been positioned in different respective rotational positions.

Referring now to FIG. 4, the height of each light directing member 18, and the spacing between the light sources 16, is such that each light source 16 lies approximately midway between the upper and lower walls 20, 22 of a corresponding one of the light directing members 18. In this way, each light source 16 cooperates with its own one of the light directing members 18 such that light from the light source 16 passes first through the transparent wall of the elongate support tube 14 and then through the interior passage 19 of the cooperating light directing member 18. As the light directing members 18 are open at both ends in this embodiment, each light directing member 18 directs light away from the lamp 10 in two respective opposite directions (i.e. each direction passing through a respective one of the two open ends). By rotating any one of the light directing members 18 around the elongate support tube 14, the two opposite directions in which light is directed away from the lamp 10 are changed dependent on the rotational position of the light directing member 18.

Figure 5:
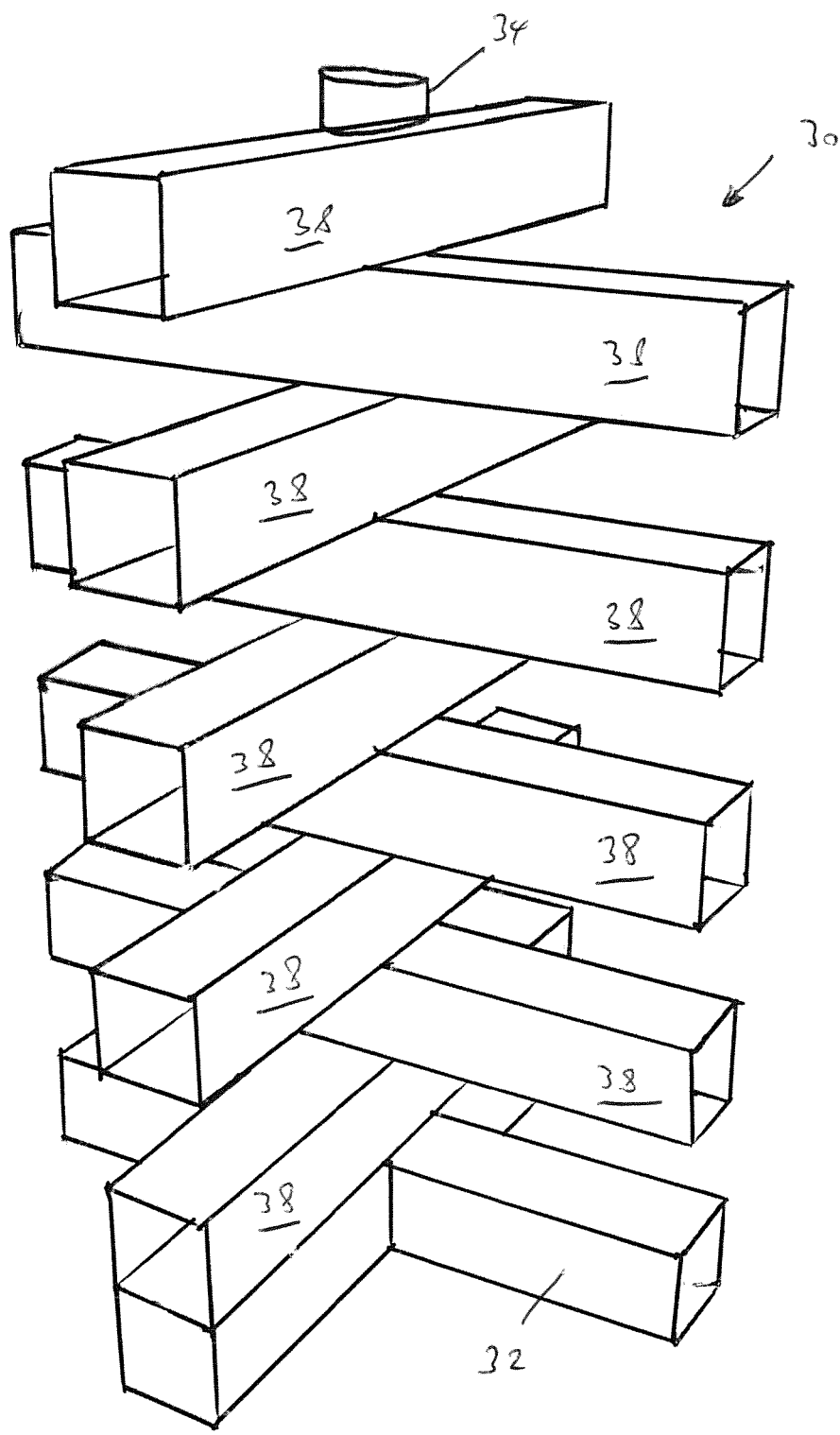
FIG. 5 is a perspective view of a second embodiment of a lamp.
Figure 6:
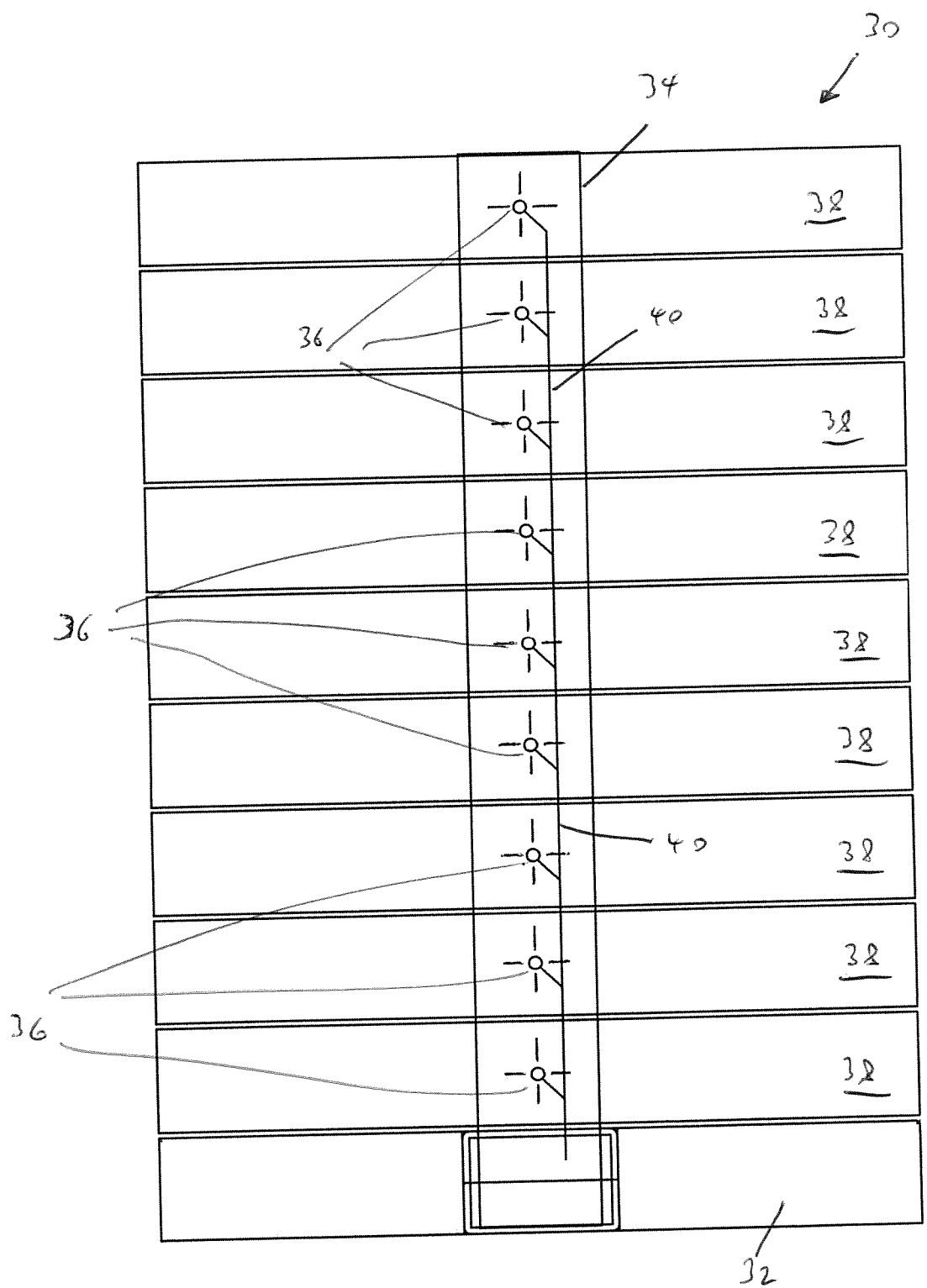
FIG. 6 is a cross-sectional view of the lamp of FIG. 5.

It will be appreciated that any plural number of light directing members 18 may be provided. The first lamp 10 shown in FIGS. 1 to 4 has seven light directing members 18. A second lamp 30 having nine light directing members is shown in FIGS. 5 and 6. The second lamp 30 has a base 32, an elongate support tube 34, nine separate light sources 36 and nine light directing members 38. The structure and operation of the second lamp 30 are very similar to those of the first lamp 10 and so the second lamp 30 will not be described in detail. It will be noticed, however, that wiring suitable for powering the light sources 36 is shown schematically in FIG. 6 at number 40.

It will be appreciated that many modifications may be made to the lamp without departing from the scope of the invention as defined in the appended claims.

For example, the elongate support tube 14, 34 may have a cross-section other than circular. Any suitable cross-section, such as square, hexagonal or octagonal, for example, may be used. Indeed, the elongate support tube 14, 34 could be replaced by any suitable structure capable of supporting the light directing members. For example, the elongate support tube 14 of the first lamp 10 could be replaced by four rods lying parallel to one another and at the corners of a notional square. In this case, the light sources 16 would be positioned within the notional square defined by the four rods. The top and bottom holes 26, 28 of the light directing members 18 would have a diameter sufficient to accommodate the four rods and to allow rotation of the light directing members 18 around the elongate support formed by the four rods.

It is not necessary for the light directing members 18, 38 to have a square cross-section. The light directing members 18, 38 could be tubes having any suitable cross-sections such as, for example, a circular cross-section. Whereas the light directing members in either lamp 10, 30 described above are identical to one another, this need not be the case and a lamp may have light directing members of different design.

In the first and second lamps 10, 30 described above, the light directing members 18, 38 are tubes having two opposed open ends. However, this need not be the case. Each light directing member 18, 38 could be a tube having one closed end and one open end. In this way, light would be directed out of the open end. It is not necessary for the light directing members 18, 38 to be tubes. Any suitable structure which serves to direct light in a defined direction and which can be rotated around an elongate support may be used.

The base 12, 32 need not be a cruciform type base as shown in the Figures. Any suitable base may be used. For example, the base may be a disc. It is not necessary to use a base at all. In some circumstances, it is desirable not to use a base and to provide the elongate support with an attachment which allows the elongate support to be suspended, for example from the ceiling of a room. In this case, the elongate support may be provided with some sort of stop at the bottom end so as to prevent the light directing members from falling off the lower end of the elongate support.

In the first and second lamps 10, 30 described above, the light generating unit comprises a plurality of distinct light sources 16, 36. Whereas this is the preferred arrangement, this need not be the case. The light generating unit may be, for example, some form of elongate light unit which emits light generally uniformly along its length. By way of a more specific example, the light generating unit may be a fluorescent tube or filament containing tube of a suitable size to fit within the elongate support.

In the first and second lamps 10, 30 described above, the light directing members 18, 38 lie one on top of another contacting one another. However, this need not be the case. Washers, or some other spacing means, may be provided between adjacent light directing members 18, 38 to space the light directing members 18, 38 from one another.

In the first and second lamps 10, 30 described above, the elongate support tubes 14, 34 have a straight orientation. However, elongate supports which have a curved orientation may also be used. In this case, it is necessary to ensure that the curvature does not prevent relative rotation of the light directing members. In one such arrangement, the light directing members may be spaced from one another by suitable spacers. In this manner, the light directing members can be rotated relative to one another without colliding with one another, even though the elongate support has a curved orientation.

The lamp may be provided in kit form. In this case, the base, elongate support, light directing members and light generating unit may be provided in disassembled form.

What is claimed is:

1. A lamp comprising: an elongate support, a plurality of light directing members, and a light generating unit;
    the light directing members being supported by the elongate support at respective different positions along the length of the elongate support, each light directing member being rotatable at least partially around the elongate support to select a rotational position of the light directing member from a respective range of rotational positions of the light directing member;
    wherein the light generating unit comprises a plurality of light sources, the light sources being supported by the elongate support at respective different positions along the length of the elongate support, and wherein each light directing member corresponds with a respective one of the light sources so that at any rotational position within said respective range of rotational positions of the light directing member, the light directing member receives light from the corresponding light source and directs the light away from the lamp in a direction dependent on the selected rotational position of the light directing member.

2. A lamp according to claim 1, wherein the rotational position of each light directing member being selected independently of the respective selected rotational positions of the other light directing members.

3. A lamp according to claim 1, wherein each light directing member comprises a respective tube which defines a respective interior passage, the light from the light generating unit being directed along the interior passage of the light directing member away from the lamp.

4. A lamp according to claim 3, wherein each light directing member has a respective aperture which receives the elongate support for said rotation of the light directing member around the elongate support, and wherein the aperture of each light directing member transects the interior passage of the light directing member.

5. A lamp according to claim 4, wherein the tube of each light directing member comprises four side walls arranged such that the tube has a rectangular cross-section defined by the four side walls, the aperture passing through two opposite ones of the side walls, one of said opposite ones of the side walls of each light directing member lying generally parallel to a side wall of an adjacent light directing member.

6. A lamp according to claim 1, wherein the elongate support comprises a tube, wherein the light sources are positioned within the tube at respective different positions along the length of the tube, and wherein the tube has a light transmitting wall such that light from each light source which is received by the cooperating light directing member passes through the light transmitting wall to be received by the light transmitting member.

7. A lamp according to claim 1, wherein the elongate support comprises a tube having a light transmitting wall, and wherein the light sources are positioned within the tube of the elongate support at respective different positions along the length of the tube, each light directing member comprising a respective tube which defines an respective interior passage, each light directing member having a respective aperture which receives the tube of the elongate support for said rotation of the light directing member around the elongate support, the aperture of each light directing member transecting the interior passage of the light directing member, and wherein each light source lies within the aperture of the cooperating one of the light directing members so that the light from the light source passes through the light transmitting wall of the tube of the elongate support and then along the interior passage of the cooperating one of the light directing members away from the lamp.

8. A lamp according to claim 6, wherein the tube of the elongate support is circular in cross-section.

9. A lamp according to claim 6, wherein the lamp is provided with a fan which propels air through the tube of the elongate support so as to cool the light sources within the tube of the elongate support.

10. A lamp according to claim 1, wherein each light source is selected from the group consisting of: an LED light source or an incandescent light bulb.

11. A lamp according to claim 3, wherein the tube of each light directing member is formed from aluminium.

12. A lamp according to claim 1, further comprising a base for positioning on a flat surface, the base supporting the elongate support in a generally upstanding orientation.

13. A lamp according to claim 1, further comprising an attachment by which the elongate support being suspended.

14. A kit for assembly to form a lamp, the kit comprising:
an elongate support, a plurality of light directing members, and a light generating unit;
the light directing members being supportable by the elongate support at respective different positions along the length of the elongate support such that, when so supported, each light directing member is rotatable at least partially around the elongate support to select a rotational position of the light directing member from a respective range of rotational positions of the light directing member;
wherein the light generating unit comprises a plurality of light sources, when assembled the light sources being supported by the elongate support at respective different positions along the length of the elongate support, and wherein when assembled each light directing member corresponds with a respective one of the light sources so that at any rotational position within said respective range of rotational positions of the light directing member the light directing member receives light from the corresponding light source and directs the light away from the lamp in a direction dependent on the selected rotational position of the light directing member.

15. A lamp according to claim 7, wherein the tube of the elongate support is circular in cross-section.

16. A lamp according to claim 7, wherein the lamp is provided with a fan which propels air through the tube of the elongate support so as to cool the light sources within the tube of the elongate support.

17. A lamp according to claim 7, wherein the tube of each light directing member is formed from aluminium.

18. A kit according to claim 14, wherein when assembled the rotational position of each light directing member being selected independently of the respective selected rotational positions of the other light directing members.

19. A kit according to claim 14, wherein each light directing member comprises a respective tube which defines a respective interior passage, when assembled the light from the light generating unit being directed along the interior passage of the light directing member away from the lamp.

20. A kit according to claim 14, wherein the elongate support comprises a tube, wherein when assembled the light sources are positioned within the tube at respective different positions along the length of the tube, and wherein the tube has a light transmitting wall such that when assembled light from each light source which is received by the cooperating light directing member passes through the light transmitting wall to be received by the light transmitting member.

* * * * *